(12) United States Patent
Lee

(10) Patent No.: US 9,183,985 B2
(45) Date of Patent: Nov. 10, 2015

(54) METHOD FOR WINDING COIL ON AN OBJECT

(71) Applicant: Hyundai Motor Company, Seoul (KR)

(72) Inventor: Tae Won Lee, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 288 days.

(21) Appl. No.: 13/721,884

(22) Filed: Dec. 20, 2012

(65) Prior Publication Data

US 2013/0105612 A1    May 2, 2013

Related U.S. Application Data

(62) Division of application No. 12/847,972, filed on Jul. 30, 2010, now Pat. No. 8,436,703.

(30) Foreign Application Priority Data

Dec. 2, 2009  (KR) .................... 10-2009-0118739

(51) Int. Cl.
| | |
|---|---|
| H01F 7/06 | (2006.01) |
| H01F 41/06 | (2006.01) |
| F16D 27/14 | (2006.01) |
| F04D 13/02 | (2006.01) |
| H02K 3/18 | (2006.01) |

(52) U.S. Cl.
CPC .......... *H01F 41/0625* (2013.01); *F04D 13/027* (2013.01); *F16D 27/14* (2013.01); *H02K 3/18* (2013.01); *Y10T 29/49071* (2015.01); *Y10T 29/49117* (2015.01)

(58) Field of Classification Search
USPC .............. 29/602.1, 605, 606; 242/437, 437.2, 242/437.3, 444.3, 444.4; 335/250, 256, 335/266, 282, 299; 417/223, 319
See application file for complete search history.

(56) References Cited

U.S. PATENT DOCUMENTS

| | | | | |
|---|---|---|---|---|
| 3,812,443 | A * | 5/1974 | Schroeder | 336/192 |
| 5,500,839 | A * | 3/1996 | Miyake et al. | 369/13.22 |
| 6,690,255 | B2 * | 2/2004 | Caramela et al. | 336/200 |
| 6,894,412 | B2 | 5/2005 | Han et al. | |
| 6,910,654 | B2 | 6/2005 | Kawano et al. | |
| 7,201,344 | B2 * | 4/2007 | Higeta | 242/437 |
| 7,932,803 | B2 | 4/2011 | Hirai | |
| 8,471,663 | B2 * | 6/2013 | Cho et al. | 336/182 |
| 8,500,657 | B2 * | 8/2013 | Brown | 600/585 |
| 2001/0015393 | A1 * | 8/2001 | Miyazaki et al. | 242/437.3 |
| 2007/0182326 | A1 * | 8/2007 | Versluijs | 313/578 |
| 2009/0015004 | A1 * | 1/2009 | Long | 285/39 |

FOREIGN PATENT DOCUMENTS

| | | |
|---|---|---|
| CN | 1492564 A | 4/2004 |
| CN | 1551253 A | 12/2004 |
| CN | 1828794 A | 9/2006 |
| CN | 101449346 A | 6/2009 |
| JP | 58-163240 A | 9/1983 |
| JP | 06-061072 A | 3/1994 |
| JP | 2009-180267 A | 8/2009 |
| KP | 59-019723 A | 2/1984 |

* cited by examiner

*Primary Examiner* — Paul D Kim
(74) *Attorney, Agent, or Firm* — Morgan, Lewis & Bockius LLP

(57) ABSTRACT

A method for winding a coil on an object, wherein the coil includes a plurality of first coils and a plurality of second coils, may have winding the first coils on an exterior circumferences of the second coils, wherein an outer circumferences of the respective second coil is enclosed and in contact with outer circumference of at least three first coils, and wherein cross-sectional area of the second coil is smaller than that of the first coil, and wherein the outer circumference of the at least three first coils are in contact each other.

12 Claims, 3 Drawing Sheets

METHOD FOR WINDING COIL ON AN OBJECT

CROSS-REFERENCE TO RELATED APPLICATION

The present application is a Divisional of U.S. patent application Ser. No. 12/847,972, filed Jul. 30, 2010, now U.S. Pat. No. 8,436,703, which claims priority to Korean Patent Application No. 10-2009-0118739, filed in the Korean Intellectual Property Office on Dec. 2, 2009, the entire contents of which is are incorporated herein for all purposes by this reference.

BACKGROUND OF THE INVENTION

1. Field of the Invention

The present invention relates to a method for winding a coil on an object and a water pump of clutch type provided with the coil. More particularly, the present invention relates to a method for winding more coils on an object having a limited space, and to a water pump of clutch type provided with a coil securing a sufficient operation performance without increasing a size of the water pump of clutch type by using this method.

2. Description of Related Art

Generally, a water pump circulates coolant to an engine and a heater in order to cool the engine and heat a cabin.

The coolant flowing out from the water pump circulates a cylinder block and/or a cylinder head of an engine and cools the engine. In addition, the coolant circulates a heat exchanger and cools an exhaust gas of high temperature. At this time, temperature of the coolant rises, and the heated coolant is used for warming up a cabin of a vehicle. In addition, the heated coolant is cooled at a radiator and flows in the water pump again.

Such a water pump is largely divided into a mechanical water pump and an electric water pump.

The mechanical water pump is connected to a pulley fixed to a crankshaft of the engine and is driven according to a rotation of the crankshaft (i.e., a rotation of the engine). Therefore, coolant amount flowed out from the mechanical water pump is determined according to a rotation speed of the engine.

On the contrary, the electric water pump is driven by a motor controlled by a control apparatus. Therefore, the electric water pump can determines the coolant amount regardless of the rotation speed of the engine. Since components used in the electric water pump, however, is electrically operated, it is important for electrically operated components to have sufficient waterproof performance. If the components have sufficient waterproof performance, performance and durability of the electric water pump may also improve. In addition, the electric water pump has more components (a stator, a rotor, a water-proof means, and so on) than the mechanical water pump. So, manufacturing cost of the electric water pump is expensive and it is difficult to manufacture the electric water pump.

Recently, a mechanical water pump (e.g., water pump of clutch type) which selectively pressurizes the coolant according to a driving condition of the engine and supplies it to the engine has been developed. According to such a water pump of clutch type, a pulley is selectively connected to a shaft according to the driving condition of the engine, and the selectively connection of the pulley and the shaft is achieved by magnetic force generated by a coil wound on a coil case.

Hereinafter, a conventional method for winding a coil on a coil case of a water pump of clutch type will be described.

FIG. 4 is a cross-sectional view of a conventional coil, and FIG. 5 is an enlarged view of FIG. 4.

As shown in FIG. 4 and FIG. 5, coil layers 210 are wound on a coil case according to a conventional art. A coil 212 in the coil layers 210 is wound so as to form a plurality of rows. At this time, the coil 212 is wound as a rhombohedral packing. That is, cross-sectional centers of a plurality of coils forming a m-th row and a (m+1)-th row are arranged to form a zigzag shape, and an angle $\theta$ between the cross-sectional centers of the two neighboring coils forming the m-th row and one cross-sectional center of the coil forming the (m+1)-th row and contacting with the cross-sectional centers of the two neighboring coils is 60°. However, a pore 216 is formed among three neighboring coils 212 among a rhombohedral packing. Formation of the pore 216 restricts numbers of coils wound on the coil case.

Generally, magnetic force generated by the coil 212 is proportional to the numbers of coils 212 wound on the coil case. Therefore, it is very important for improving operation performance of a water pump of clutch type to wind more coils 212 on the coil case having a limited space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method for winding a coil on an object having advantages of generating strong magnetic force as a consequence of winding more coils on an object having a limited space and to provide a water pump of clutch type having advantages of securing sufficient operation performance without increasing size as a consequence of winding more coils on a coil case of the water pump of clutch type.

In an aspect of the present invention, a method for winding a coil on an object, wherein the coil comprises a first coil and a second coil, cross-sectional area of the second coil being different from cross-sectional area of the first coil, may have winding the first coil on an exterior circumference of the object or the second coil such that cross-sectional centers of a plurality of first coils form a row, and winding the second coil on the first coil such that cross-sectional centers of a plurality of second coils form a row, wherein winding the first coil and winding the second coil are repeated by predetermined numbers such that a plurality of rows of the first coil and the second coil is wound on the object, and wherein the cross-sectional centers of the first coil and the second coil are disposed to form a zigzag shape each other.

The cross-sectional centers of the first coils may be disposed to form a plurality of columns vertically disposed to the rows, wherein (m,n), (m,n+1), (m+1 and n+1), and (m+1,n) cross-sectional centers among the cross-sectional centers of the first coils are disposed to form a square, and wherein m and n are any natural numbers, and a (m,n) cross-sectional center means a cross-sectional center of the coil disposed at an intersecting point of a m-th row and a n-th column.

Cross-sectional area of the second coil may be smaller than that of the first coil, wherein each cross-section of the second coil is disposed in a pore formed among the (m,n), (m,n+1), (m+1 and n+1), and (m+1,n) cross-sections of the first coil, and wherein the cross-sectional area of the second coil is approximately 17% of or smaller than that of the first coil.

Current of the first coil may flow in an opposite direction of that of the second coil.

In another aspect of the present invention, a method for winding a coil on an object, wherein the coil comprises a plurality of first coils and a plurality of second coils, may include winding the first coils on an exterior circumferences of the second coils, wherein an outer circumferences of the respective second coil is enclosed and in contact with outer circumference of at least three first coils, and wherein cross-sectional area of the second coil is smaller than that of the first coil, wherein the outer circumference of the at least three first coils are in contact each other.

In further another aspect of the present invention, the water pump of clutch type which receives a coolant, pressurizes the coolant by a rotation of an impeller fixed to a shaft, and supplies the pressurized coolant to a cooling circuit may include a pulley connected to a crankshaft so as to rotate according to a rotation of the crankshaft, a hub at which the shaft is mounted so as to rotate together with the shaft, a pin selectively connecting the hub to the pulley, an elastic member always exerting elastic force on the pin, and a coil selectively applying magnetic force to the pin to an opposite direction of the elastic force, wherein the coil is wound on a case and includes first and second coils with different cross-sectional area, the first coil and the second coil are wound on the case by turns, and the first coil and the second coil are disposed to form a zigzag shape.

The first coil may be wound as a cubic packing, wherein the second coil is disposed in a pore among the first coils wound as the cubic packing, and wherein the cross-sectional area of the second coil is approximately 17% of or smaller than that of the first coil.

Current of the first coil may flow in an opposite direction of that of the second coil.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
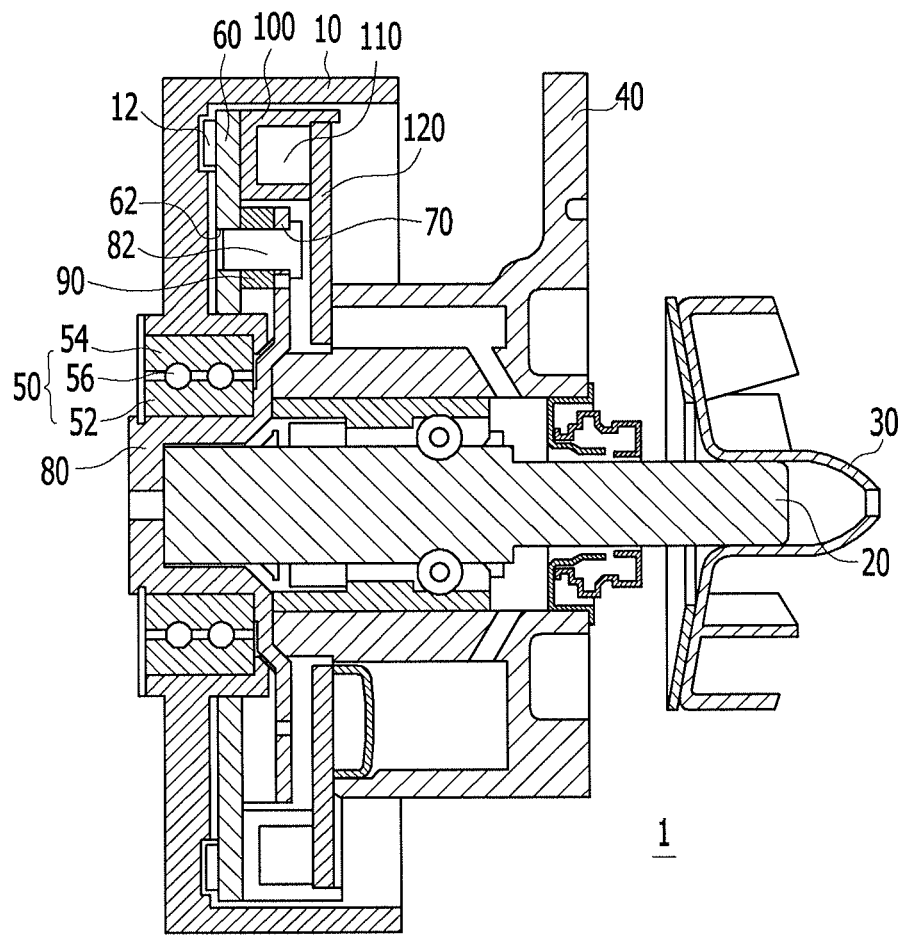
FIG. 1 is a cross-sectional view of a water pump of clutch type to which a coil according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a cross-sectional view of a water pump of clutch type to which a coil according to an exemplary embodiment of the present invention is applied.

As shown in FIG. 1, a water pump of clutch type 1 includes a pump housing 40, a pump cover (not shown), a pulley 10, a hub 80, a shaft 20, and a coil 110.

The pump housing 40 has a disk shape and is provided with a penetration hole formed at a middle portion thereof. Coupling means for coupling the pump housing 40 with the pump cover are disposed at an external circumferential portion of the pump housing 40. Generally, a bolt (not shown) is used as the coupling means. The shaft 20 is disposed in the penetration hole, and an impeller 30 is fixed to one end of the shaft 20. A bearing for smoothly rotating the shaft 20 is disposed between the shaft 20 and the penetration hole.

The pump cover is coupled with the pump housing 40 so as to form a chamber (not shown) therebetween in which coolant is pressurized. The impeller 30 is disposed in the chamber. In addition, the chamber is connected to an inlet (not shown) so as to receive the coolant circulating a cooling circuit (not shown), and is connected to an outlet (not shown) such that the pressurized coolant is supplied to the cooling circuit. The impeller 30 rotates together with the shaft 20 and pressurizes the coolant flowing in the chamber.

The pump housing 40, the pump cover, and the impeller 30 according to an exemplary embodiment of the present invention are similar to those according to conventional arts and are well known to a person of an ordinary skill in the art. Therefore, a detailed description thereof will be omitted.

The pulley 10 has an annular shape having an exterior circumference and an interior circumference. A belt (not shown) is mounted at the exterior circumference of the pulley 10. The pulley 10 is connected to a crankshaft (not shown) through the belt. Therefore, the pulley 10 rotates according to a rotation of the crankshaft. Therefore, the pulley 10 always rotates when an engine operates.

The pulley 10 is provided with a friction pad 12 mounted at one surface thereof (a surface facing the pump housing 40), and a clutch disk 60 rubbing with the friction pad 12 is provided. The clutch disk 60 is always rotated together with the pulley 10 by frictional force of the friction pad 12. A first hole 62 is formed at the clutch disk 60.

The hub 80 has a disk shape, and a shaft mounting portion is formed at a middle portion thereof. The shaft 20 is mounted in the shaft mounting portion, and accordingly, the hub 80 rotates with the shaft 20. In addition, a bearing 50 is disposed between the hub 80 and the interior circumference of the pulley 10 so as to permit relative rotation of the pulley 10 to the hub 80. That is, the pulley 10 always rotates when the engine operates. However, the hub 80 is selectively connected to the pulley 10 and selectively rotates together with the pulley 10. The bearing 50 includes an inner ring 52 fixed to the hub 80, an outer ring 54 fixed to the interior circumference of the pulley 10, and rolling elements 56 mounted between the inner ring 52 and the outer ring 54.

A second hole 70 corresponding to the first hole 62 is formed at an external circumferential portion of the hub 80. A pin 82 for selectively connecting the hub 80 with the pulley 10 is inserted in the second hole 70. The pin 82 inserted in the second hole 70 is selectively inserted in or came out from the first hole 62 according to magnetic force generated by the coil 110 and elastic force of an elastic member 90 fighting against the magnetic force. If the pin 82 inserted in the second hole 70 is inserted in the first hole 62, the hub 80 is connected to and rotates with the pulley 10. If the pin 82 inserted in the second hole 70 is not inserted in the first hole 62 on the contrary, connection between the hub 80 and the pulley 10 is cut off and the hub 80 does not rotate.

The elastic member 90 is disposed between the hub 80 and the clutch disk 60 and applies the elastic force fighting against the magnetic force generated by the coil 110 to the hub 80. A coil spring is mainly used as the elastic member 90.

The coil 110 is wound on a coil case 100. The coil case 100 has an annular shape, one surface thereof (a surface facing the pump housing 40) is open, so as to receive the coil 110, the opened surface is blocked by a coil cover 120 after the coil 110 is wound on the coil case 100. Therefore, the coil 110 wound on the coil case 100 is not uncoiled by the coil cover 120. If the current is applied to the coil 110, the magnetic force is generated at the coil 110. The magnetic force pulls the pin 82 such that the pin 82 comes out from the first hole 62. Therefore, if the current is applied to the coil 110, the connection of the hub 80 with the pulley 10 is cut off.

Hereinafter, referring to FIG. 2 and FIG. 3, the coil 110 according to the exemplary embodiment of the present invention will further be described.

Figure 2:
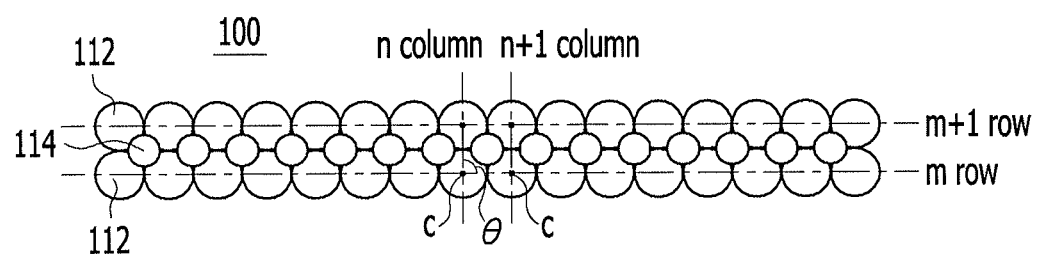
FIG. 2 is a cross-sectional view of a coil according to an exemplary embodiment of the present invention.
Figure 3:
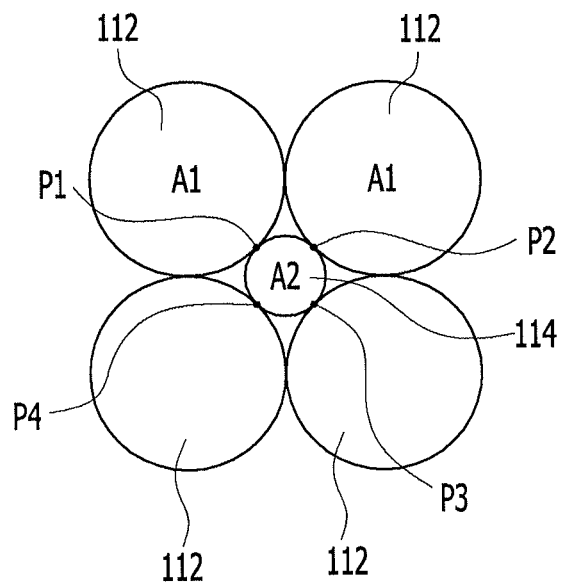
FIG. 3 is an enlarged view of FIG. 2.
Figure 4:
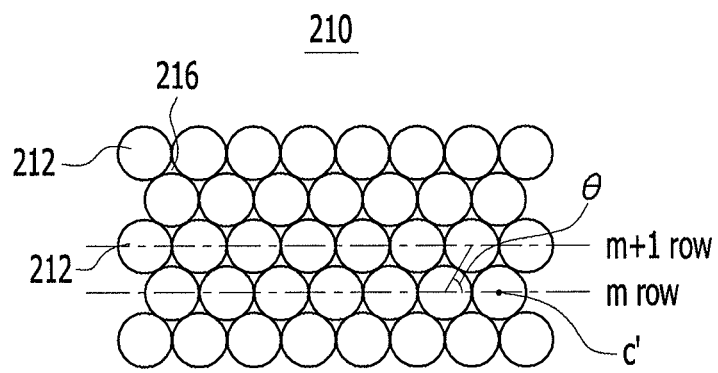
FIG. 4 is a cross-sectional view of a conventional coil.
Figure 5:
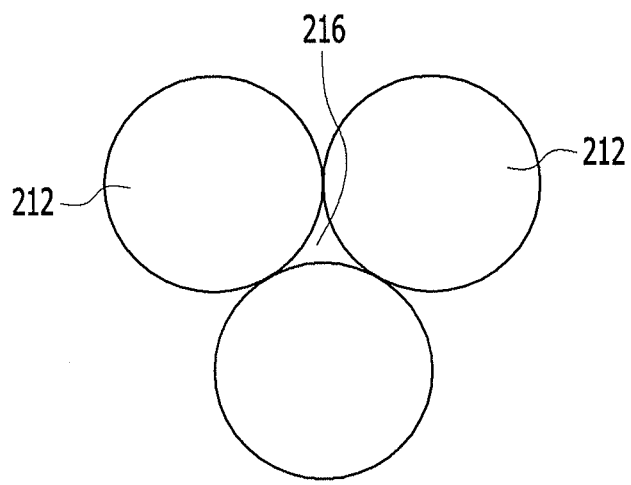
FIG. 5 is an enlarged view of FIG. 4.

FIG. 2 is a cross-sectional view of a coil according to an exemplary embodiment of the present invention, and FIG. 3 is an enlarged view of FIG. 2.

As shown in FIG. 2 and FIG. 3, the coil 110 includes a first coil 112 and a second coil 114. Cross-sectional area of the first coil 112 is different from that of the second coil 114. Herein, it is exemplarily described that the cross-sectional area A2 of the second coil 114 is smaller than that A1 of the first coil 112.

The first coil 112 is wound on the coil case 100 or the second coil 114, and the second coil 114 is wound on the first coil 112. Cross-sectional centers of the first and second coils 112 and 114 form a row. In addition, the first and second coils 112 and 114 are wound by a predetermined numbers so as to form a plurality of rows. The first coil 112 and the second coil 114 are disposed to form a zigzag shape. In addition, the first coil 112 is wound as a cubic packing. That is, the cross-sectional centers of the first coil 112 are disposed to form a plurality of columns vertically disposed to the rows. Therefore, (m,n), (m,n+1), (m+1 and n+1), and (m+1,n) cross-sectional centers are disposed to form a square shape. That is, an angle θ between a connecting line of the (m,n) cross-sectional center with the (m,n+1) cross-sectional center and a connecting line of the (m,n) cross-sectional center with the (m+1, n) cross-sectional center is 90°, and length of one connecting line is the same as that of another connecting line. Herein, m and n are any natural numbers, and a (m,n) cross-sectional center means a cross-sectional center of the coil disposed at an intersecting point of a m-th row and a n-th column.

Generally, if the first coil 112 is wound as the cubic packing, porosity increases compared with a porosity if the first coil 112 is wound as the rhombohedral packing. However, the second coil 114, the cross-sectional area A2 of which is smaller than that A1 of the first coil 112, is disposed in the pore formed among the (m,n), (m,n+1), (m+1 and n+1), and (m+1,n) cross-sections of the first coil 112 according to the exemplary embodiment of the present invention. Therefore, porosity may be reduced. It is preferable that the pore among the first coil 112 is completely filled with the second coil 114. Accordingly, the second coil 114 contacts with the first coils 112 surrounding it at four points P1, P2, P3, and P4.

If diameter of the first coil 112 is 1, the porosity is about 0.546. Therefore, diameter of the second coil 114 completely filling the pore (generally, density of the coil 110 is increased by pressing the coil 110.) is about 0.417. Therefore, a ratio of the cross-sectional area A1 of the first coil 112 to that A2 of the second coil 114 is about 1,0.174. Therefore, it is preferable that the cross-sectional area A2 the second coil 114 is 17% of or smaller than that A1 of the first coil 112.

Reduction in the porosity means that the numbers of the coils 110 wound on the coil case 100 increases. The magnetic force generated at the coil 110 is proportional to the numbers of the coils 110 wound on the coil case 100 and the numbers of the poles. Since the number of the coils 110 wound on the coil case 100 increases, the magnetic force generated at the coil 110 is stronger according to the exemplary embodiment of the present invention.

In addition, the current of the first coil 112 flows in an opposite direction that of the second coil 114. Therefore, the number of the pores increases.

Further, since porosity of the coil 110 is reduced, the coils 110 are more pressed to each other. Therefore, slip of the coil 110 may be prevented, and accordingly, spread of adhesive for preventing slip of the coil 110 is unnecessary.

According to an exemplary embodiment of the present invention, a stronger magnetic force is generated at coils without increasing size of an object as a consequence of winding more coils on the object having a limited space. Therefore, capacity of devices (for example, a motor, a generator, a pump, and so on) generating the magnetic force by flowing current through the coil may increase without increasing size thereof.

For convenience in explanation and accurate definition in the appended claims, the terms "upper", "lower", "interior", "exterior", "inner", and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for winding a coil on an object, wherein the coil comprises a first coil and a second coil, cross-sectional area of the second coil being different from cross-sectional area of the first coil, the method comprising:

winding the first coil on an exterior circumference of the object or the second coil such that cross-sectional centers of a plurality of first coils form a row; and winding the second coil on the first coil such that cross-sectional centers of a plurality of second coils form a row, wherein winding the first coil and winding the second coil are repeated by predetermined numbers such that a plurality of rows of the first coil and the second coil are wound on the object or the second coil, and wherein the cross-sectional centers of the first coil and the second coil are disposed to form a zigzag shape with each other.

2. The method of claim 1, wherein the cross-sectional centers of the first coils are disposed to form a plurality of columns vertically disposed to the rows.

3. The method of claim 2, wherein (m,n), (m,n+1), (m+1 and n+1), and (m+1,n) cross-sectional centers among the cross-sectional centers of the first coils are disposed to form a square, and wherein m and n are any natural numbers, and a (m,n) cross-sectional center means a cross-sectional center of the first coil disposed at an intersecting point of a m-th row and a n-th column.

4. The method of claim 3, wherein the cross-sectional area of the second coil is smaller than that of the first coil, and wherein each cross-section of the second coil is disposed in a pore formed among the (m,n), (m,n+1), (m+1 and n+1), and (m+1,n) cross-sections of the first coil.

5. The method of claim 4, wherein the cross-sectional area of the second coil is approximately 17% of or smaller than that of the first coil.

6. The method of claim 1, wherein a current of the first coil flows in an opposite direction to that of the second coil.

7. A method for winding a coil on an object, wherein the coil comprises a first coil and a second coil, cross-sectional area of the second coil being different from cross-sectional area of the first coil, the method comprising:

winding the first coil on an exterior circumference of the object such that cross-sectional centers of a plurality of first coils form a row; and winding the second coil on the first coil such that cross-sectional centers of a plurality of second coils form a row, wherein winding the first coil and winding the second coil are repeated by predetermined numbers such that a plurality of rows of the first coil and the second coil are wound on the object, and wherein the cross-sectional centers of the first coil and the second coil are disposed to form a zigzag shape with each other.

8. The method of claim 7, wherein the cross-sectional centers of the first coils are disposed to form a plurality of columns vertically disposed to the rows.

9. The method of claim 8, wherein (m,n), (m,n+1), (m+1 and n+1), and (m+1,n) cross-sectional centers among the cross-sectional centers of the first coils are disposed to form a square, and wherein m and n are any natural numbers, and a (m,n) cross-sectional center means a cross-sectional center of the first coil disposed at an intersecting point of a m-th row and a n-th column.

10. The method of claim 9, wherein the cross-sectional area of the second coil is smaller than that of the first coil, and wherein each cross-section of the second coil is disposed in a pore formed among the (m,n), (m,n+1), (m+1 and n+1), and (m+1,n) cross-sections of the first coil.

11. The method of claim 10, wherein the cross-sectional area of the second coil is approximately 17% of or smaller than that of the first coil.

12. The method of claim 7, wherein a current of the first coil flows in an opposite direction to that of the second coil.

\* \* \* \* \*